United States Patent [19]

Akao

[11] Patent Number: 4,780,357
[45] Date of Patent: * Oct. 25, 1988

[54] PACKAGING MATERIAL FOR PHOTOSENSITIVE MATERIALS FOR PHOTOGRAPHIC PURPOSES

[75] Inventor: Mutsuo Akao, Kanagawa, Japan

[73] Assignee: Fuji Photo Film Co., Ltd., Kanagawa, Japan

[*] Notice: The portion of the term of this patent subsequent to May 20, 2003 has been disclaimed.

[21] Appl. No.: 886,975

[22] Filed: Jul. 16, 1986

[30] Foreign Application Priority Data

Jul. 17, 1985 [JP] Japan .................... 60-157665

[51] Int. Cl.$^4$ .................... B32B 5/16; B65D 65/40
[52] U.S. Cl. .................... 428/216; 428/328; 428/340; 428/408; 428/447; 428/461; 428/516; 428/476.9; 428/319.7; 428/317.1; 428/513; 428/424.8; 428/518; 428/910; 428/35; 428/349; 428/355; 264/176.1; 206/455; 206/497
[58] Field of Search ............... 428/216, 408, 340, 516, 428/328, 447, 476.9

[56] References Cited

U.S. PATENT DOCUMENTS 4,452,846 6/1984 Akao .................... 428/511
4,513,050 4/1985 Akao .................... 428/463

Primary Examiner—P. C. Ives
Attorney, Agent, or Firm—Burgess, Ryan and Wayne

[57] ABSTRACT

A packaging material for photographic photosensitive materials which comprises a coextruded double layer film comprising a low-pressure linear low-density polyethylene resin layer located on heat sealing side and a polypropylene resin layer or a layer of a polyethylene resin of which density is 0.93 to 0.970 g/cm$^3$ located on the other side, either of the above layers contains 0.5 to 30 g/m$^2$ of metal powder or carbon black, and the above low-pressure linear low-density polyethylene resin layer contains 0.05 to 1% by weight of a lubricant.

This packaging material is superior in tear strength, impact puncture strength, tensile strength, light-shielding, moisture proofing, slipping character and heat sealing ability. It is also suitable, for example, for packaging a small piece of photographic materials such as X-ray films for dental use.

6 Claims, 2 Drawing Sheets

PACKAGING MATERIAL FOR PHOTOSENSITIVE MATERIALS FOR PHOTOGRAPHIC PURPOSES

BACKGROUND OF THE INVENTION

1. Field of the Invention

This invention relates to a packaging material for photosensitive materials for photographic purposes.

2. Description of Prior Art

Various types of packaging materials for photographic photosensitive materials have widely been put to practical use, and various properties are required according to their uses.

As the packaging materials for photographic photosensitive materials, it is necessary that various properties be present such as light-shielding, slitability, gas barrier, moisture proofing, antistatic property, rigidity, physical properties such as breaking strength, tear strength, impact puncture strength, Gelbo test strength and wear resistance, heat sealing properties such as heat seal strength, cut sealability, hot tack properties (hot-sealability) and seal ability of contraries, flatness antiblocking, slipping character and the like. The slitability is the property capable of cutting film smoothly without jag or rupture. The cut sealability is the suitability for fuging seal. In this sealing method, the hot plate for press is changed to a knife-shaped, and melting adhesion and cutting occur simultaneously.

Figure 8:
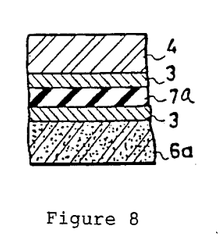
Figure 9:
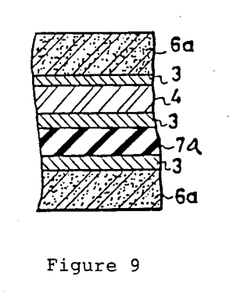

Generally, it is difficult to satisfy these properties by a single material. Therefore, a single layer film of a high-pressure low-density polyethylene (LDPE) kneaded with carbon black or a pigment, and a composite laminated film composed of a LDPE film and a flexible sheet such as paper, aluminum foil or cellophane, etc. have been employed. An example of the conventional laminated film is shown in FIG. 8. This film is composed of a light-shielding LDPE film layer 6a, a light-shielding metal foil layer 7a laminated on it through an adhesive layer 3, and a flexible sheet layer 4 laminated thereupon through an adhesive layer 3. Another example of the conventional film is shown in FIG. 9. This film was used for packaging color photographic printing paper, and it is composed of a light-shielding LDPE film layer 6a, a light-shielding metal foil layer 7a, a flexible sheet layer 4, and a light-shielding LDPE film layer 6a. They are laminated in that order, and an adhesive layer 3 is provided between each layers.

On the other hand, the present inventor has already disclosed a laminated film for photographic photosensitive materials of which physical strength was improved by combining two uniaxially stretched films (U.S. Pat. No. 4,331,725). With respect to the packaging material containing a low-pressure linear low-density polyethylene (L-LDPE), a packaging material comprising at least one light-shielding film layer of polyethylene polymer of which more than 50 wt. % is L-LDPE and containing more than 1 wt. % of a light-shielding material has been disclosed (U.S. Pat. No. 4,452,846).

Physical properties of the conventional laminated films are not enough, and during packaging, the films were sometimes torn or perforated or heat sealing of the films was sometimes separated. In addition, when a large amount of a light-shielding material such as carbon black is added, physical strength of the film is lowered. Then, the amount was set about 3%, and thickness of the film was more than 70 μm. As a result, the film was stiff, and working efficiency of the packaging process was badly influenced. Cost of the packaging was also expensive.

In the case of the laminated film dislosed in the specification of U.S. Pat. No. 4,331,725, heat sealing properties are not good because of using uniaxially stretched high-density polyethylene film, and problems in sealing occasionally happened in packaging processes. In the case of cross-laminated films where two uniaxially stretched films were directly laminated so as to cross each other without laminating an aluminum foil, when a photosensitive material was packaged in a gusset bag, pinholes were appreciably formed at its gusset portion.

By employing L-LDPE resin for the packaging material, physical strength such as tear strength and Gelbo test strength are raised and blending amount of a light-shielding material can be increased. However, when thickness of the film was thinned, crumples and creases occurred, and tensile strengh, slipping character, rigidity, moisture proofing, gas barrier, production aptitude, etc. became insufficient. On the other hand, its slitability and cut sealability were inferior.

Particularly, as the packaging materials for X-ray films for dental use, as the packaging materials for radiograph films for detecting radiation exposure of a person who treats radioactive materials (badge film) and as the packaging materials for vacuum packaging of the X-ray films described in Japanese Patent KOKOKU No. 55-24089, the development of single films capable of satisfying all properties required as the above packaging materials has been desired.

SUMMARY OF THE INVENTION

It is an object of the invention to provide a packaging material for photographic photosensitive materials which has superior slitability, physical strength and heat sealing properties.

It is another object of the invention to provide a packaging material for photographic photosensitive materials which is suitable for X-ray films for dental use, for radiograph films for detecting radiation exposure and for other small pieces of photographic materials.

It is a further object of the invention to provide a packaging material for photographic photosensitive materials which is inexpensive.

Such objects can be achieved by the packaging material for photographic photosensitive materials which comprises a coextruded double layer film comprising a low-pressure linear low-density polyethylene resin layer located on the heat sealing side and a polypropylene (PP) resin layer or a layer of a polyethylene resin of which density is 0.930 to 0.970 g/cm$^3$ (M-HDPE) located on the other side, either of the above layers contains 0.5 to 30 g/m$^2$ of metal powder or carbon black, and the above low-pressure linear low-density polyethylene resin layer contains 0.05 to 1% by weight of a lubricant.

BRIEF DESCRIPTION OF THE DRAWINGS

The packaging material of FIG. 1 is the most fundamental packaging material of the invention which is a coextruded double layer film Ⓐ being moistureproof and light-shielding and consisting of a light-shielding M-HDPE or PP resin layer 2a containing metal powder or carbon black and a light-shielding L-LDPE resin layer 1a containing metal powder or carbon black, both layers are simultaneously formed by melt coextrusion.

The packaging material of FIG. 2 consists of the coextruded double layer film Ⓐ of FIG. 1 wherein the light-shielding M-HDPE or PP resin layer 2a is thinner than the corresponding layer 2a of FIG. 1 and a flexible sheet layer 4 or a light-shielding M-HDPE or PP resin layer 2a containing metal powder or carbon black is laminated through an adhesive layer 3.

The packaging material of FIG. 3 consists of a coextruded double layer film Ⓐ, a metal foil 7a laminated thereon through an adhesive layer 3 and a flexible sheet layer 4 or a M-HDPE or PP resin layer 2 further laminated thereon through an adhesive layer 3.

The packaging material of FIG. 4 corresponds to that of FIG. 3 wherein the metal foil 7a is replaced by a metallized flexible sheet layer 5a consisting of a flexible sheet layer 4 or a M-HDPE or PP resin layer 2 on which a metal thin film 5a is formed, and wherein the L-LDPE resin layer 1 does not contain metal powder nor carbon black.

The packaging material of FIG. 5 consists of a coextruded double layer film Ⓐ of which the light-shielding M-HDPE or PP resin layer 2a is thicker than the light-shielding L-LDPE resin layer 1a, and a flexible sheet layer 4 or a M-HDPE or PP resin layer 2 laminated through an adhesive layer 3.

The packaging material of FIG. 6 is a coextruded double layer film Ⓐ being moistureproof and light-shielding and consisting of a M-HDPE or PP resin layer 2 not containing metal powder nor carbon black and a light-shielding L-LDPE resin layer 1a containing metal powder or carbon black.

The conventional packaging material of FIG. 7 is a single layer film of a light-shielding LDPE film layer 6a.

The conventional packaging material of FIG. 8 consists of a light-shielding LDPE film layer 6a, a metal foil layer 7a laminated thereon through an adhesive layer 3, and a flexible sheet layer 4 further laminated thereon through an adhesive layer 3. This packaging material was used for the products which particularly require moisture-proofing.

The conventional packaging material of FIG. 9 consists of the laminated film of FIG. 8 and a light-shielding LDPE film layer 6a laminated thereon through an adhesive layer 3. This laminated film was used for the packaging material which is required physical strength such as the inner sheet of a double-sheets gusset bag for packaging a roll of photographic color printing paper.

DETAILED DESCRIPTION OF THE INVENTION

L-LDPE is a copolymer of ethylene and α-olefin, and it has a linear structure having short branches. Carbon number of the α-olefin is 3-13, preferably 6-10, and examples are butene-1, 4-methylpentene-1, hexene-1, heptene-1 and octene-1. Preferable α-olefins are 4-methylpentene-1 and hexene-1. Suitable ethylene content of L-LDPE is 85-99.5 mol. %, i.e. α-olefin content is 0.5-15 mol. %, and preferable ethylene content is 90-99.5 mol. %, i.e. α-olefin content is 0.5-10 mol. %. Suitable density is in the range of 0.87-0.95 g/cm$^3$, preferably 0.930-0.945 g/cm$^3$ (ASTM D-1505). Melt index (M.I., at 190° C.) is preferably 0.8-30 g/10 minutes (ASTM D-1238). Such a L-LDPE is manufactured by vapor phase or liquid phase low pressure method. Examples of L-LDPE are "UNIPOLE" (trade name, UCC), "DOWLEX" (trade name, Dow Chemical Co., Ltd.), "STAMILEX" (trade name, DSM), "SUCLEAR" (trade name, du Pont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals Co., Ltd.) and "NUC POLYETHYLENE-LL" and "TUFUN" (trade names, Nippon Unicar Co., Ltd.).

Thickness of the L-LDPE resin layer is usually 20 to 160 μm. This L-LDPE resin layer is located on the heat sealing side, i.e. so as to face each other at heat sealing.

A M-HDPE resin layer or a PP resin layer is laminated on the L-LDPE resin layer by coextrusion.

The M-HDPE resin is low-pressure or medium-pressure polyethylene resin. It belongs to high-density or medium-density polyethylene resin, and its density is in the range of 0.930 to 0.970 g/cc (ASTM D 1505). MI is in the range of 0.03 to 5 g/10 minutes (ASTM D-1238). This resin is manufactured by a medium-pressure process such as Phillips process or Standard process or by a low-pressure process such as Ziegler process. Preferable M-HDPE resin is few branched, linear and highly crystallized polyethylene manufactured by low-pressure process. Its density is 0.945 to 0.965, and MI is 0.05 to 1.5 g/10 minutes. Examples of M-HDPE resin are "SUNTEC-HD" (Asahi Chemical Industries Co., Ltd.), "SHOLEX" (Showa Denko K.K.), "SUMIKATHENE HARD" (Sumitomo Chemical Co., Ltd.), "CHISSO POLYETHY" (Chisso Corp.), "NISSAN POLYETHYLENE" (Nissan Maruzen Polyethylene), "HIZEX" (Mitsui Petroleum Chemical Industries Co., Ltd.), "NISSEKI STAFLENE" (Nippon Petrochemicals Co., Ltd.), "NOVATEC" (Mitsubishi Chemical Industries Ltd.), "MITSUBISHI POLYETHY HD" (Mitsubishi Petrochemical Co., Ltd, "NIPOLON HARD" (Toyo Soda Manufacturing Co., Ltd.), "IDEMITSU POLYETHYLENE" (Idemitsu Petrochemical Co., Ltd.) and "TONEN POLYETHYLENE" (Tonen Sekiyu Kagaku K.K.). A part of L-LDPE resin may also be utilized as this M-HDPE resin.

The PP resin includes homopolypropylene and ethylene-propylene copolymers which are random type or block type. Density of the PP resin usable in the invention is 0.90 to 0.91 g/cm$^3$, and its MI is 1 to 12 g/10 minutes. Examples are "NISSEKI POLYPRO" (Nippon Petrochemicals Co., Ltd.), "UBE POLYPRO" (UBE Industries Ltd.), "SHO-ALLOMER" (Showa Denko K.K.), "SUMITOMO NOBLEN" (Sumitomo Chemical Co., Ltd.), "MITSUBISHI NOBLEN" (Mitsubishi Petrochemical Co., Ltd.), "CHISSO POLYPRO" (Chisso Corp.), "TOKUYAMA POLYPRO" (Tokuyama Soda K.K.), "MITSUI SEKIYUKAGAKU POLYPRO" (Mitsui Petroleum Chemical Industries Co., Ltd.) "MITSUI NOBLEN" (Mitsui Toatsu Chemicals Inc.).

M-HDPE resin and PP resin may be blended to use.

Thickness of the M-HDPE or PP resin layer is preferably 20% to 80% of total thickness of the coextruded double layer film.

Either of the coextruded double layers should contain metal powder or carbon black.

As the metal powder, aluminum powder and its paste are preferable. The paste of aluminum powder is produced by adding mineral spirit and a small amount of a higher fatty acid such as stearic acid or oleic acid to form paste at the production of aluminum powder according to a known method such as using a ball mill, a stamp mill or an atomizer. A polyolefin thermoplastic resin such as various polypropylene resins, various polyethylene resins, ethylene-vinyl acetate copolymer (EVA), ethylene-ethyl acrylate copolymer (EEA) and ethylene-acrylic acid copolymer (EAA) is kneaded together with this aluminum paste under heating, and volatile components mainly mineral spilit are removed by a vacuum pump. This product is used as aluminum paste compound resin or aluminum paste masterbatch resin.

The aluminum paste masterbatch resin is preferable because of eliminating bad smell and bad influence upon the photographic photosensitive materials by minimizing the content of mineral spirit in the coextruded film such as less than 0.1% by weight. For example, the masterbatch containing 40% by weight of aluminum paste and 1% by weight of mineral spirit is blended with L-LDPE resin to form a L-LDPE resin layer containing 2% by weight of aluminum paste. In this case, one part by weight of aluminum paste masterbatch is blended with 19 parts by weight of natural L-LDPE resin, and mineral spirit content of the L-LDPE resin layer becomes less than 0.05% by weight since a part of the mineral spirit evaporates during film formation. In the case of M-HDPE or PP resin layer, the similar effects are obtained.

The aluminum powder includes microflakes produced from aluminum foil which is crushed by a ball mill or a stamp mill, in addition to usual aluminum powder manufactured by atomization, dropping on a rotary disc or evaporation from melted aluminum. Since aluminum powder is unstable, it is stabilized by a known treatment. Production of metal flake is disclosed, for example, in U.S. Pat. No. 4,469,282 and Japanese Patents KOKOKU Nos. 37-6779 and 46-6718, and production of metal powder for blending with plastics is disclosed, for example, in Japanese Patent KOKAI No. 59-75931.

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic character, they are also preferable, though they are expensive. They may be blended with the oil furnace black in order to improve its character. Suitable pH of carbon black is at 5 to 9, particularly at 6 to 8, and suitable mean particle size is 10 to 120 m$\mu$. Particularly, the oil furnace carbon black having pH 6 to 8 and mean particle size of 15 to 30 m$\mu$ is preferable. By using the carbon black of such pH and particle size, a packaging material having the following merits is obtained. That is, the occurrence of fogging is rare, increase or decrease of photosensitivity scarcely happens, light-shielding ability is large, and the lumps of carbon black and pinholes such as fish eye hardly generate.

As the method of blending metal powder or carbon black with the resin, powder blending method, paste blending method, wet blending method, compound coloring method and masterbatch method, etc. may be employed. Among them, the masterbatch method is preferable in view of cost and clear process. Various masterbatch methods are known, and any known method may be employed. Such a masterbatch method includes the method of dispersing carbon black into a polymer organic solvent solution to produce a masterbatch (Japanese Patent KOKOKU NO. 40-26196) and the method of dispersing carbon black into polyethylene to produce a masterbatch (Japanese Patent KOKOKU No. 43-10362).

In this method, first, a masterbatch of LDPE is prepared by blending more than 2%, usually more than 10%, of carbon black with LDPE. Then, L-LDPE, M-HDPE or PP is mixed with this masterbatch so that carbon black content becomes a prescribed value. Instead of LDPE, other polyolefin resins such as EEA and EVA or other thermoplastic resins capable of mixing with L-LDPE, M-HDPE or PP may also be employed. In this masterbatch method, mixing and dispersing of carbon black is easier than the case of blending carbon black directly with L-LDPE, M-HDPE OR PP. As a result, fish eye problem is improved and manufacturing cost is lowered. In addition, though the L-LDPE resin layer or the M-HDPE or PP resin produced by this method always contain LDPE, processing character of the mixed polymer of L-LDPE, M-HDPE or PP with LDPE is superior to that of L-LDPE, M-HDPE or PP alone. The resin for masterbatch is not limited to LDPE. As this resin, a polyolefin resin of which MI is higher than L-LDPE, M-HDPE or PP is preferable because of homegeneous blending. L-LDPE, M-HDPE or PP may also be employed as the resin for masterbatch in order to save cost. Metal powder may be blended similarly.

L-LDPE resin film is superior to LDPE resin film in strength, but it is inferior in the difficulty of processing, the occurrence of blocking between films and its poor slipping character. Accordingly, it was considered that this film was not suitable for packaging. However, the present inventor has examined the influence of carbon black upon L-LDPE resin, and he has found that physical strength of the L-LDPE resin largely increases by blending carbon black contrary to the case of LDPE resin, HDPE resin, etc. That is, strength of LDPE resin and HDPE resin is essentially weaker than L-LDPE resin, and it is remarkably lowered by adding carbon black.

The effect of carbon black clearly appears at 1 wt. %, and remarkably appears at more than 3 wt. %. While, lumps increase with increasing the amount of carbon black. When its content exceeds 30 wt. %, the lumps remarkably increases and pinholes also forms. On the other hand, carbon black is effective as light-shielding. In this case, light-shielding effect appears at 0.3 wt. %, clearly appears at 1 wt. %, and remarkably appears at more than 3 wt. %. As the packaging material for photosensitive materials, moistureproofness, flatness, strength of film surface, heat seal ability and contamination of a photosensitive article or material are also problems. Accordingly, when these problems are also taken into consideration, suitable content of carbon black is in the range of 0.1 to 10 wt. %, and the range of 3 to 7 wt. % is particularly preferable.

Blending amount of metal powder and also carbon black depends on area. Suitable amount is in the range of 0.5 to 30 g/m², and preferable amount is 1.5 to 18 g/m².

Metal powder may be used together with carbon black, and in this case, the total amount is adjusted to the above range.

Metal powder or carbon black may be added to either or both of L-LDPE resin layer and M-HDPE or PP resin layer. When it is added to the both layers, the total amount is adjusted to the above range.

By blending metal powder or carbon black, light-shielding, antistatic property, antiblocking, moisture proofing and physical strength are improved.

On the other hand, processing aptitude and insertion of the product to be packaged are improved by blending a lubricant. The lubricant prevents generations of static electricity during molding of film and packaging of photographic photosensitive products. In also prevents blocking of films and improves molding aptitude for T die extrusion or inflation process.

The lubricant is added to L-LDPE resin layer. Suitable content of the lubricant is 0.05 to 1 wt. %. When the content is less than the above range, the above functions become insufficient. When the content is beyond the range, various defects appear. That is, heat sealing properties become inferior and excess lubricant badly influences upon the photosensitive materials packaged (Development troubles occur). The layer becomes sticky, and dusts adhere on it. In terms of the influence on photosensitive materials and improvement of the foregoing properties including slipping character, silicone lubricants, fatty acid amide lubricants and fatty acid lubricants are preferable. The silicone lubricants include dimethylpolysiloxane. The fatty acid amide lubricants have a carbon number of 10 to 50, preferably 15 to 35, and it includes an alkylene bis fatty acid amide. Examples of such a fatty acid amide are oleic acid amide, erucic acid amide and stearic acid amide. Carbon number of the fatty acids is in the same range as the above case of the fatty acid amides.

Examples of commercial lubricants suitable for the present invention include;

Silicone lubricants; "SHINETSU SILICONE" (Shinetsu Chemical Co., Ltd.) "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18" (Nippon Fine Chemical Co., Ltd.), "AMIDE-O" (Nitto Kagaku K.K.), "DIAMID O-200" and "DIAMID G-200" (Nippon Kasei Chemical Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "BISAMIDE" (Nitto kagaku K.K.), "DIAMID-200 BIS" (Nippon Kasei Chemical Co., Ltd.), "ARMOWAX-EBS" (Lion Akzo Co., Ltd.)

"ELECTROSTRIPPER" (Kao Corp.) is also preferable because it particularly improves slipping character and antistatic property, though it does not belong to the above classification.

As the resin to be blended with L-LDPE, LDPE or HDPE is preferably employed. However, other polyolefin resins, such as medium-density polyethylene (MDPE) resin, various polypropylene resins, ethylene-vinyl acetate copolymer (EVA), ethylene-ethyl acrylate copolymer (EEA), ethylene-methacrylate copolymer (EMA), and ethylene-acrylic acid copolymer (EAA), etc., can be added to the extent so far as its fundamental characteristics are not changed.

Various additives may be added to one or more of the above layers. Examples of the additives are described below.

(1) Plasticizer; phthalic acid esters, glycol esters, fatty acid esters, phosphoric acid esters, etc.

(2) Stabilizer; lead compounds, cadmium compounds, zinc compounds, alkaline earth metal compounds, organic tin compounds, etc.

(3) Antistatic agent; cation surfactants, anion surfactants, nonion surfactants, ampholytic surfactants, etc.

(4) Flame retardant; phosphoric acid esters, phosphoric acid ester halides, halides, inorganic materials, polyols containing phosphor, etc.

(5) Filler; alumina, kaolin, clay, calcium carbonate, mica, talc, titanium oxide, silica, etc.

(6) Reinforcing agent; glass lobing, metallic fiber, glass fiber, glass milled fiber, carbon fiber, etc.

(7) Coloring agent; inorganic pigments (Al, $Fe_2O_3$, $TiO_2$, ZnO, CdS etc.), organic pigments (carbon black, etc.), dyes, etc. agents (ammonium (8) Blowing agent; inorganic blowing agents (ammonium carbonate, sodium hydrogen carbonate), organic blowing agents (nitroso compounds, azo compounds) etc.

(9) Vulcanizing agent, vulcanization accelerator, acceleration assistant, etc.

(10) Deterioration preventing agent, ultraviolet absorber, antioxidant, metal deactivator, peroxide decomposing agent, etc.

(11) Coupling agent; silane compounds, titanium compounds, chromium compounds, aluminum compounds etc.

(12) Various thermoplastic resins, rubbers

Coextrusion may be carried out according to a known method such as T die extrusion or inflation process.

The packaging material of the invention may be composed of a L-LDPE - M-HDPE or PP coextruded double layer film alone, or other flexible sheet(s) may be laminated thereon.

In the case of the coextruded double layer film alone, thickness of the film is practically 50 to 200 μm, preferably 70 to 180 μm, more preferably 100 to 160 μm. In order to secure light-shielding, gas barrier, moisture proofing, rigidity, physical strength such as tensile strength, tear strength, impact puncture strength and Gelbo test strength, heat seal strength, cut sealability, flatness, slipping character and prevention of pinholes at heat sealing part, the thickness should be thicker than 50 μm. Particularly, in the case that the photosensitive materials is weight, highly sensitive or sharply degraded by moisture, oxygen gas or sulfur gas, the thickness is suitably thicker than 70 μm, preferably thicker than 100 μm. On the other hand, in terms of low temperature heat seal ability, slitability, bag-making aptitude, cut sealability and cost, its thickness is thinner than 200 μm, preferably 10% or more thinner than conventional LDPE film.

In the case of the latter composite film, thickness of the coextruded film can be 10% or more thinner than the case of the coextruded film alone. The flexible sheet capable of laminating on the coextruded film includes various thermoplastic resin films which may be unstretched, uniaxially stretched or biaxially stretched such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various flexible sheets such as a metallized film such as aluminum-metallized film, cellulose acetate film, cellophane, polyvinyl alcohol film, paper, metal foil such as aluminum foil, non-woven fabric, cross laminated airly fabric, a porous film, foamed polyethylene sheet, foamed polypropylene sheet, foamed polystyrene sheet and foamed polyurethane sheet are also suitable.

When the packaging material is a composite film, the L-LDPE resin layer of the coextruded film should be located as the inner face layer to touch a photosensitive article or material.

Flexible sheet layers may be laminated according to an usual method such as a heat sealing (hot bar sealing, impulse heat sealing, supersonic welding, etc.), the method using an adhesive (wet laminating, dry laminating, hot melt laminating, extrusion laminating, etc.) and coextrusion method. In the case of utilizing coextrusion method, a flexible sheet layer may be coextruded together with the L-LDPE resin layer and the M-HDPE or PP resin layer by triple layer coextrusion. When a flexile sheet layer is laminated by extrusion laminating using a thermoplastic resin, thickness of the adhesive layer is usually 7 to 100 μm, preferably 13 to 50 μm. However, this thickness is determined by considering cost, application rate, total thickness of the packaging material, etc., and accordingly, it is not limited to the above range.

The packaging material of the invention is suitable for packaging silver halide photographic photosensitive materials, diazo photographic photosensitive materials, photosensitive resins, self-developing type photographic materials and diffusion-transfer type photographic materials.

Package form may be usual, and includes a single-sheet flat bag, a double-sheets flat bag, a square bottom bag, a self-standing bag, a single-sheet gusset bag, a double-sheets gusset bag, a film sheet, inner lining for a moisture proof box and a leader paper. The sealing form may also be usual, and includes heat sealing, impulse heat sealing, supersonic welding and high frequency sealing. The methods of using an adhesive and a pressure sensitive adhesive may also be utilized.

The packaging materials of the invention is improved in slipping character, tear strength, impact puncture strength, tensile strength, slitability, hot-seal ability, heat seal strength, seal ability of contraries, light-shielding, moisture proofing, cut sealability, high sealing (vacuum packaging aptitude), processing aptitude, bag-making aptitude, rigidity, antistatic property and other properties. As a result, its thickness can be made thinner than conventional packaging material, and its cost is lowered.

The packaging materials of the invention can be used for packaging any photographic photosensitive materials. However, it is suitable for packaging a small piece of photographic materials such as X-ray films for dental use.

EXAMPLES

Figure 1:
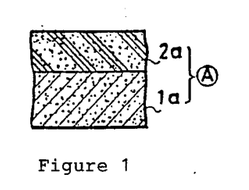
FIGS. 1 to 6 are sectional views of preferred embodiments of the invention.

The packaging material of Example 1 corresponds to the embodiment illustrated in FIG. 1. The light-shielding L-LDPE resin layer 1a consisted of L-LDPE resin ("ULTZEX #2021L", α-olefin; 4-methylpentene-1, Density; 0.920 g/cm$^3$, MI 0.920 g/10 minutes, Mitsui Petrochemical Industries Co., Ltd.) containing 3 weight % of oil furnace carbon black and 0.2 weight % of oleic acid amide lubricant, and its thickness was 30 μm. The light-shielding M-HDPE resin layer 2a consisted of M-HDPE resin ("HIZEX #3300F, Density; 0.954 g/cm$^3$, MI; 1.1 g/10 minutes, Mitsui Petrochemical Industries Co., Ltd.) containing 3 wt. % of oil furnace carbon black and 0.07 wt. % of oleic acid amide lubricant, and its thickness was 120 μm. Accordingly, total thickness was 150 μm.

The packaging material of Example 2 also corresponds to the embodiment of FIG. 1. The light-shielding L-LDPE resin layer 1a consisted of L-LDPE resin ("STAMILEX #1046", α-olefin; octene-1, Density; 0.925 g/cm$^3$, MI; 4 g/10 minutes, DSM) containing 3 wt. % of oil furnace carbon black and 0.2 wt. % of oleic acid amide lubricant and its thickness was 30 μm. The light-shielding M-HDPE resin layer 2a consisted of L-LDPE resin ("ULTZEX #3520L", Density; 0.935 g/cm$^3$, MI; 2.1 g/10 minutes, Mitsui Petrochemical Industries Co., Ltd.) containing 3 wt. % of oil furnace carbon black, and its thickness was 120 μm. Accordingly, total thickness was 150 μm.

Figure 2:
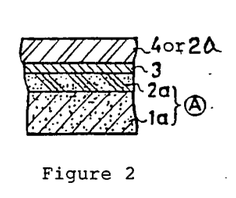
Figure 3:
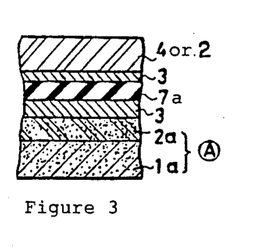
Figure 4:
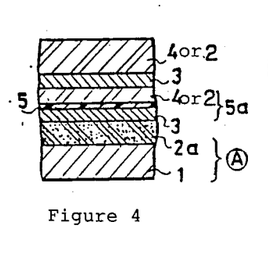
Figure 5:
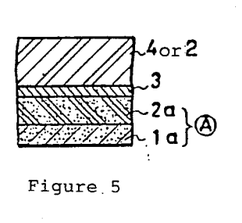

The packaging material of Example 3 corresponds to the embodiment of FIG. 2. 35 g/m$^2$ of bleached kraft paper 4 was laminated on the M-HDPE resin layer 2a of Example 1 through a LDPE extrusion adhesive layer 3 being 15 μm in thickness.

The packaging material of Example 4 corresponds to the embodiment of FIG. 2. Spunbonded nonwoven fabric instead of bleached kraft paper was laminated on the M-HDPE resin layer 2a of Example 1.

Comparative packaging material 1 corresponds to FIG. 1. Instead of the light-shielding L-LDPE resin layer 1a and the light-shielding M-HDPE resin layer 2a, a light-shielding L-LDPE resin layer consisting of L-LDPE resin ("ULTZEX #2021L", α-olefin; 4-methylpentene-1, Density; 0.920 g/cm$^3$, MI; 2.1 g/10 minutes, Mitsui Petrochemical Industries Co., Ltd.) containing 3 wt. % of oil furnace carbon black was formed by inflation molding wherein blow-up ratio was 1.0. Thickness of the film was 150 μm.

Comparative packaging material 2 also corresponds to FIG. 1. Composition of the layer was the same as the comparative packaging material 1, and thickness was changed to 110 μm.

Figure 7:
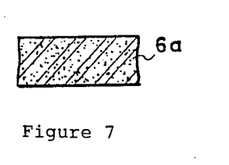
FIGS. 7 to 9 are sectional views of conventional packaging materials.

Conventional packaging material 1 corresponds to FIG. 7. This packaging material 1 consisted of a light-shielding LDPE resin layer 6a containing 3 wt. % of oil furnace carbon black and being 150 μm in thickness.

Conventional packaging material 2 corresponds to FIG. 8. This packaging material 2 consisted of 70 μm in thickness of a light-shielding LDPE resin layer 6a containing 3 wt. % of the carbon black and 0.05 wt. % of the lubricant, 7 μm thick of aluminum foil 7a laminated thereon through 15 μm thick of a LDPE extrusion adhesive layer 3, and 35 g/m$^2$ of bleached kraft paper 4 further laminated through 15 μm thick of a LDPE extrusion adhesive layer 3.

Conventional packaging material 3 corresponds to FIG. 9. This packaging material 3 consisted of the laminate of the conventional packaging material 2 where thickness of the light-shielding LDPE resin layer 6a was changed from 70 μm to 50 μm and 50 μm thick of a light-shielding LDPE resin layer laminated on the side of the bleached kraft paper 4 through 15 μm thick of a LDPE extrusion adhesive layer 3.

Conventional packaging material 4 corresponds to FIG. 2 wherein the layers Ⓐ is replaced by the layer 6a. This packaging material 4 consisted of 150 μm thick of the light-shielding LDPE resin layer 6a of the conventional packaging material 1 and 35 g/m² of bleached kraft paper 4 laminated thereon through 15 μm thick of a LDPE extrusion adhesive layer 3.

The composition of the above packaging materials are in Tables 1 and 3, and their properties are tablated in Tables 2 and 4.

In the packaging materials, the following materials are employed;

LDPE layer 6a:
"DFD-0111" (Nippon Unicar Co., Ltd.)
MI: 2.4 g/10 minutes
Density: 0.923 g/cm³

LDPE adhesive layer 3:
"MIRASON 14"
(Mitsui Polychemicals Co., Ltd.)
MI: 5.1 g/10 minutes
Density: 0.919 g/cm³

Carbon black:
"#44B Oil furnace carbon black" (Mitsubishi Chemical Industries Ltd.)
Mean particle size: 21 mμ, pH: 7.7

TABLE 1

| | | Coextruded Double Layer Film Alone | | | | | |
|---|---|---|---|---|---|---|---|
| | | Invention | | Conventional | Comparative | | Testing |
| | Unit | 1 | 2 | 1 | 1 | 2 | Method |
| Resin Density | g/cm³ | 1a 0.920 2a 0.954 | 1a 0.925 2a 0.935 | 0.923 | 0.920 | 0.920 | ASTM D1505 |
| Content of Light-Shielding Material | wt. % | 1a 3 2a 3 | 1a 3 2a 3 | 3 | 3 | 3 | |
| Content of Lubricant | " | 1a 0.2 2a 0.07 | 1a 0.2 2a 0 | 0 | 0 | 0 | |
| Kind of Resin | | 1a ULTZEX 2a HIZEX | 1a STAMILEX 2a ULTZEX | LDPE DFD-0111 | L-LDPE ULTZEX-2021L | " | |
| Thickness | μm | 1a 30 2a 120 | 1a 30 2a 120 | 150 | 150 | 110 | JIS P-8118 |

TABLE 2-1

| | | Coextruded Double Layer Film Alone | | | | | |
|---|---|---|---|---|---|---|---|
| | | Invention | | Conventional | Comparative | | Testing |
| | Unit | 1 | 2 | 1 | 1 | 2 | Method |
| Tear Strength (MD) | g | 1428 | 1600< | 323 | 1600< | 1347 | JIS P-8116 |
| Tear Strength (CD) | " | 1600< | 1600< | 1228 | 1600< | 1600< | JIS P-8116 |
| Heat Seal Strength 150° C. | kg/15 mm | 1.62 | 1.68 | 1.38 | 1.47 | 1.41 | |
| Heat Seal Strength 170° C. | " | 3.24 | 2.93 | 2.12 | 2.01 | 1.71 | Testing Method A |
| Heat Seal Strength 190° C. | " | 3.43 | 3.03 | 2.22 | 2.13 | 1.79 | |
| Slip Angle (Right Side) | degree | 2a27.8 | 2a41 | 37.8 | 35.9 | 36.4 | Testing Method B |
| Slip Angle (Reverse Side) | " | 1a8.2 | 1a9.2 | 45< | 45< | 45< | |
| Water Vapor Permeability | g/m² 24 hr | 1.2 | 1.6 | 3.6 | 2.7 | 3.3 | According to Bag-Making Law |
| Rigidity (MD) | g·cm | 9.87 | 7.82 | 5.12 | 4.67 | 3.48 | JIS P-8125 |
| Rigidity (CD) | " | 14.36 | 11.57 | 6.03 | 5.00 | 3.85 | JIS P-8125 |

TABLE 2-2

| | | Coextruded Double Layer Film Alone | | | | | |
|---|---|---|---|---|---|---|---|
| | | Invention | | Conventional | Comparative | | Testing |
| | Unit | 1 | 2 | 1 | 1 | 2 | Method |
| Tensile Strength (MD) | kg/15 mm | 4.73 | 3.18 | 3.01 | 2.57 | 2.41 | JIS P-8113 |
| Tensile Strength (CD) | " | 4.48 | 3.23 | 2.72 | 2.32 | 2.22 | JIS P-8113 |
| Pinholes at*¹ Cut Sealing | % | 0 | 0 | 4 | 1 | 2 | |
| Sealing*² Strength | kg/15 mm | 5< | 5< | 5< | 4.5 | 4.2 | |
| Rupture of*³ Sealing | % | 0 | 0 | 50 | 0 | 0 | |

TABLE 2-2-continued

| | | Coextruded Double Layer Film Alone | | | | | |
|---|---|---|---|---|---|---|---|
| | | Invention | | Conventional | Comparative | | Testing |
| | Unit | 1 | 2 | 1 | 1 | 2 | Method |
| Hot-Seal Ability | | A | A | D | B | B | Testing Method D |
| Insertion of Products | | A | B | D | E | E | |
| Slitability | | A | A | B | D | D | |
| Blocking among Films | | None | None | Slightly Occur | Occur | Occur | |
| Bag-Making Aptitude | | A | A | D | A | A | Testing Method E |

TABLE 3

| | | Composite Film | | | | | |
|---|---|---|---|---|---|---|---|
| | | Invention | | Conventional | | | Testing |
| | Unit | 3 | 4 | 2 | 3 | 4 | Method |
| Resin Density | g/cm³ | 1a 0.920<br>2a 0.954 | " | 0.923 | 0.923 | 0.923 | ASTMD 1505 |
| Content of Light-Shielding Material | wt. % | 1a 3<br>2a 3 | " | 3 | 3 | 3 | |
| Content of Lubricant | " | 1a 0.2<br>2a 0.07 | " | 0.05 | 0.05 | 0 | |
| Kind of Resin | | 1a ULTZEX<br>2a HIZEX | " | LDPE DFD-0111 | " | " | |
| Drawing No. | | FIG. 2 | " | FIG. 8 | FIG. 9 | FIG. 2 | |
| Thickness of Light Shielding Layer | um | 150 | 150 | 70 | 50 × 2 | 150 | |
| Total Thickness | um | 205 | 205 | 146 | 195 | 205 | |

TABLE 4

| | | Composite Film | | | | | |
|---|---|---|---|---|---|---|---|
| | | Invention | | Conventional | | | Testing |
| | Unit | 3 | 4 | 2 | 3 | 4 | Method |
| Tear Strength (MD) | g | 1600< | 1600< | 183 | 294 | 9 | JISP-8116 |
| Tear Strength (CD) | g | 1600< | 1600< | 278 | 610 | 1600< | " |
| Heat Seal Strength 160° C. | kg/15 mm | 3.14 | 3.21 | 1.8 | 1.4 | 1.6 | Testing Method A |
| Heat Seal Strength 180° C. | " | 3.36 | 3.43 | 2.2 | 1.6 | 1.8 | Testing Method A |
| Impact Puncture Strength (Right) | kg·cm | 29.1 | Not Punctured | 3.8 | 5.1 | 25.2 | JISP-8134 |
| Impact Puncture Strength (Reverse) | " | 29.9 | Not Punctured | 6.1 | 5.8 | 25.4 | " |
| Light-Shielding | | A | A | B | A | A | Testing Method C |
| Seal Ability of Contraries | | A | A | D | D | D | |
| Tensile Strength (MD) | kg/15 mm | 7.3 | 8.6 | 6.1 | 7.3 | 4.9 | JISP-8113 |
| Tensile Strength (CD) | " | 7.8 | 8.9 | 5.3 | 5.8 | 4.6 | " |
| Slitability | | B | B | B | B | D | |
| Hot-Seal Ability | | A | A | D | D | D | Testing Method D |
| Bag-Making Aptitude | | A | A | B | B | D | |
| Slip Angle*5 (MD) | degree | 8.3 | 8.4 | 21.3 | 20.3 | 35.1 | Testing Method B |
| Slip Angle*5 (CD) | | 8.6 | 8.5 | 19.6 | 19.6 | 32.3 | Testing Method B |
| Blocking*6 | | None | None | Rare | Rare | Occationally | |
| Bag-Making Antitude | | A | A | A | B | D | Testing Method E |

*1 Pinhole generation at cut-sealed
*2 Sealing strength of cut-sealed product
*3 Rupture of sealing of cut-sealed bag during bending test at −10° C.
*4 slitability of packaging material
*5 Slip angle of the face to be sealed
*6 Blocking with photographic photosensitive materials Evaluations in Tables 2 and 4 were carried out as follows;
A very excellent
B excellent
C practical
D having a problem
E impractical Testing methods were as follows;
Density; JIS K 6760 (=ASTM D-1505)
Melt Index; JIS D 6760 (=ASTM 1238)
Thickness; JIS P 8118
Tear Strength; JIS P 8116

A. Heat Seal Strength;

Two sheets of exemplified film having 15 mm in width were superposed, and sealed by heat sealing at a prescribed temperature at 1 kg/cm$^2$ of sealing pressure for one second. After cooled entirely, the weight necessary to release the seal at the pulling angle of 180 degrees was determined.

B. Angle of Slip;

A part of the sample was cut off, and stuck on the underside of 75 mm length×35 mm width of a block weighing 200 g. Another part of the sample was stuck on an inclined face, and the above block was placed on the face. The inclined angle was increased, and the angle where the block began to slip was read.

C. Light-Shielding Character;

A photographic film of ASA 100 was put into the bag made by each exemplified film, and then the bag was completely sealed. This bag was exposed to the light of 80,000 luxes for one hour, and the light-shielding character was estimated by the fogging degree of the photographic film.

D. Hot Tack Properties (Hot-Seal Ability);

Two sheets of each exemplified film having 15 mm in width were sealed by heat sealing, and just after, the open ends were pulled by the weight of 45 g at the releasing angle of 22.5 degree. This character was estimated by the released length (cm).

Figure 10:
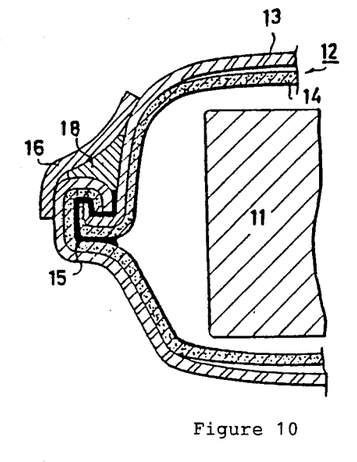
FIG. 10 is a sectional view of a photographic photosensitive material 11 packaged in a double-sheets gusset bag.

E. Bag-Making Aptitude;

Photographic photosensitive materials were packaged in the state of FIG. 10. The outer sheet 13 consisted of 73 g/m$^2$ of Clupak paper on which 15 μm in thickness of LDPE layer was laminated as heat sealing layer, and each exemplified film was used as the inner sheet 14. This property was estimated by generation of pinholes, heat sealing aptitude and curling.

Figure 11:
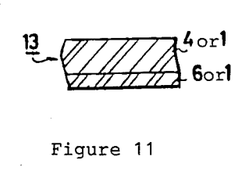
FIGS. 11 and 12 are sectional views of outer sheet of a double-sheets gusset bag.
Figure 12:
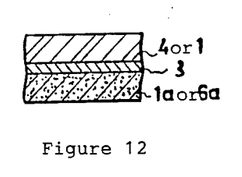

A double-sheets gusset bag for color photographic printing paper was made by using the packaging material of the invention, and illustrated in FIGS. 10 to 12.

Figure 6:
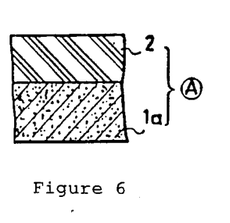

FIG. 10 is a partially sectional side view illustrating the state that a roll of color photographic printing paper was packaged in the gusset bag. This bag 12 consisted of an outer sheet 13 and an inner sheet 14. Examples of the outer sheet 13 are shown in FIGS. 11 and 12. The outer sheet 13 FIG. 11 consisted of a flexible sheet layer 4 or a L-LDPE resin layer 1 and a heat sealing layer 6 or 1 laminated thereon. The outer sheet of FIG. 12 consisted of a flexible sheet layer 4 or 1 and a light-shielding L-LDPE resin layer 1a or a light-shielding LDPE resin layer 6a laminated thereon through an adhesive layer 3. On the other hand, the packaging material of the invention such as exemplified in FIGS. 1 or 6 was used as the inner sheet 14. The inner sheet 14 and the outer sheet 13 were sealed at a center sealing of its longitudinal direction (not shown in the drawing) and an edge sealing position 15 by heat sealing. The edge was tacked and joined by an adhesive 18. A tape 16 was further stuck to form a sealing.

I claim:

1. A packaging material for photographic photosensitive materials having a heat sealing side and an opposite side, which comprises a coextruded double layer film comprising a low-pressure linear low-density polyethylene resin layer located on said heat sealing side and a polypropylene resin layer or a layer of a polyethylene resin of which density is 0.930 to 0.970 g/cm$^3$ located on the opposite side, either of said layers contains 0.5 to 30 g/m$^2$ of metal powder or carbon black, and said low-pressure linear low-density polyethylene resin layer contains 0.05 to 1% by weight of a lubricant.

2. The packaging material of claim 1, wherein the number of carbon atoms of the α-olefin copolymerized with ethylene to form said low-pressure linear low-density polyethylene is in the range of 6 to 10.

3. The packaging material of claim 1, wherein the thickness of said low-pressure linear low-density polyethylene resin layer is in the range of 20 to 160 μm and thickness of said polypropylene layer or said layer of a polyethylene resin of which density is 0.930 to 0.970 g/cm$^3$ is thicker than 20% of the total thickness of the coextruded double layer film.

4. The packaging material of claim 1, wherein said metal powder is aluminum powder.

5. The packaging material of claim 1, wherein said lubricant is a silicone lubricant, a fatty acid amide lubricant or a fatty acid lubricant.

6. The packaging material of claim 1, wherein one or more flexible sheet layers are further laminated to said double layer film.

* * * * *